United States Patent [19]

Motoori et al.

[11] 4,269,496
[45] May 26, 1981

[54] POWER SUPPLY CIRCUIT FOR CAMERA

[75] Inventors: Ryuzo Motoori, Kawaskai; Sakuji Watanabe, Warabi; Yoshiaki Ohtsubo, Kawasaki, all of Japan

[73] Assignee: Nippon Kogaku K.K., Tokyo, Japan

[21] Appl. No.: 43,647

[22] Filed: May 30, 1979

[30] Foreign Application Priority Data

May 31, 1978 [JP] Japan ................................ 53-64372

[51] Int. Cl.³ ............................................ G03B 17/40
[52] U.S. Cl. ..................................... 354/267; 307/603
[58] Field of Search .................... 354/266, 267, 60 R; 307/293; 361/196

[56] References Cited

U.S. PATENT DOCUMENTS

| 3,320,440 | 5/1967 | Reed | 361/196 X |
| 3,879,137 | 4/1975 | Sakazaki et al. | 307/293 |
| 3,893,140 | 7/1975 | Yata et al. | 354/60 R X |

FOREIGN PATENT DOCUMENTS 2242836 3/1974 Fed. Rep. of Germany ........... 354/266

Primary Examiner—Michael L. Gellner
Attorney, Agent, or Firm—Shapiro and Shapiro

[57] ABSTRACT

A power supply circuit is so designed that the power supply is interrupted to the load after a predetermined period from a switch closing signal generated when the power switch is closed. The power supply circuit is capable of preventing unnecessary consumption of the battery power resulting from defective insulation of the power switch.

5 Claims, 4 Drawing Figures

POWER SUPPLY CIRCUIT FOR CAMERA

BACKGROUND OF THE INVENTION

1. Field of the Invention

The present invention relates to a power supply circuit for supplying electric power to an exposure display device, an exposure control device etc. incorporated in a photographic camera.

2. Description of the Prior Art

The power supply switch for making and interrupting connection between a power source and electric circuits, if rendered continuously conductive for example by defective insulation, gives rise to an unnecessary power supply to the loads, thus leading to an accelerated consumption of power battery.

In recent photographic cameras there is proposed the use, on the upper end of the shutter button, of a so-called touch-switch the electrodes of which are composed of the central portion and the peripheral portion of the shutter button, said switch being designed to function based on a weak current formed when said electrodes are bridged with a finger to reduce the resistance therebetween. Said electrodes are mutually separated in ordinary state by an insulating material, but the above-mentioned drawback may appear in case of defective insulation caused when the surface of said insulating material is smeared. The power supply circuit of the present invention is particularly useful in case the switch of the above-mentioned structure is used as the power switch.

SUMMARY OF THE INVENTION

Thus the object of the present invention is to provide a power supply circuit capable of preventing unnecessary consumption of the power battery resulting from defective insulation of the power switch.

The above-mentioned object is achieved, in the power supply circuit of the present invention, by a structure which interrupts the power supply to the loads after a predetermined period from a switch closing signal generated when the power switch is closed.

DESCRIPTION OF THE PREFERRED EMBODIMENT

The present invention will be described in detail by the following explanation taken in conjunction with the attached drawings.

Figure 1:
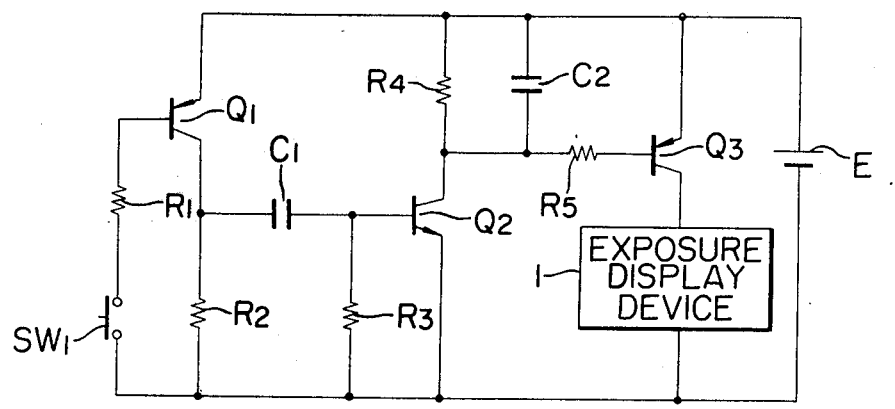
FIG. 1 is a circuit diagram showing a first embodiment of the power supply circuit for camera according to the present invention.

In FIG. 1 showing a first embodiment of the present invention, there are provided a switch element SW1 such as a touch-switch mounted on top of a shutter release button (not shown) of the camera, an amplifying transistor Q1, the base of which is connected through a current limiting resistor R1 to a terminal of said switch element SW1, a load resistor R2 connected to the collector of said transistor Q1, a capacitor C1 and a resistor R3 constituting a differentiating circuit connected to said collector, a capacitor C2 and a resistor R4 constituting a timer circuit, and a timer driving transistor Q2, the base and collector of which are respectively connected to said differentiating circuit and to said timer circuit, the collector output of said transistor Q2 being supplied through a drive resistor R5 to the base of a drive transistor Q3 for driving a load such as an exposure display device 1. The above-mentioned circuit elements receive power from a DC power source E such as cells.

The above-explained circuit functions in the following manner. Upon finger contact with the switch element SW1, the transistor Q1 is rendered conductive to generate an output (switch closing) signal of the transistor Q1, which is differentiated by the capacitor C1 and resistor R3 to render the transistor Q2 conductive for a short duration. The capacitor C2 constituting a portion of said timer circuit is charged, during said conductive period of transistor Q2, to a voltage sufficient for rendering the transistor Q3 conductive. When said transistor Q3 is rendered conductive, it remains in this state, even after the transistor Q2 returns to a non-conductive state, until the completion of gradual discharge of said capacitor C2 by a time constant determined by the capacity thereof and the resistor R4. The exposure display device 1 receives power supply from the power source E only during the conductive period of said transistor Q3.

In the above-explained structure, therefore, it becomes necessary, for observing the exposure display, to touch the switch element SW1 at predetermined intervals to renew the power supply thereto when the insulation of said switch element SW1 is not defective, but the power consumption in case of defective insulation can be minimized since the power supply to the loads such as the exposure display device is limited to such predetermined interval even in case the insulation becomes defective.

In the following there will be explained a second embodiment of the present invention shown in FIGS. 2 and 3 structured to be functional in cooperation with the shutter releasing and charging operations of the camera.

Figure 2:
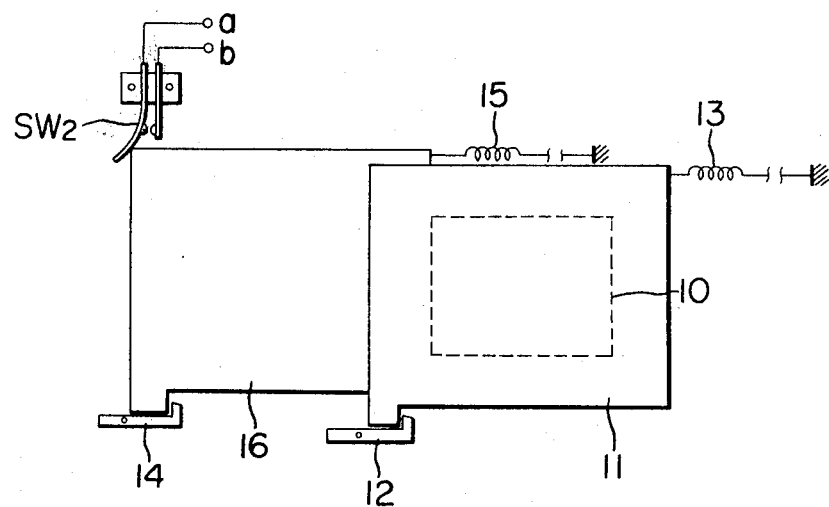
FIGS. 2 and 3 are an explanatory drawing and a circuit diagram of a second embodiment of the present invention.

FIG. 2 shows a focal plane shutter in a charged state, wherein an exposure aperture 10 is convered by a leading shutter curtain 11 which is biased by a spring 13 and initiates displacement upon release from a release hook 12, while upon release of another release hook 14 after the lapse of a predetermined exposure time a spring 15 initiates the displacement of a trailing shutter curtain 16 to cover the exposure aperture 10 again. A switch SW2 is provided in such a manner that it is opened at the shutter charging and closed upon completion of the exposure by the displacement of the trailing shutter curtain.

Figure 3:
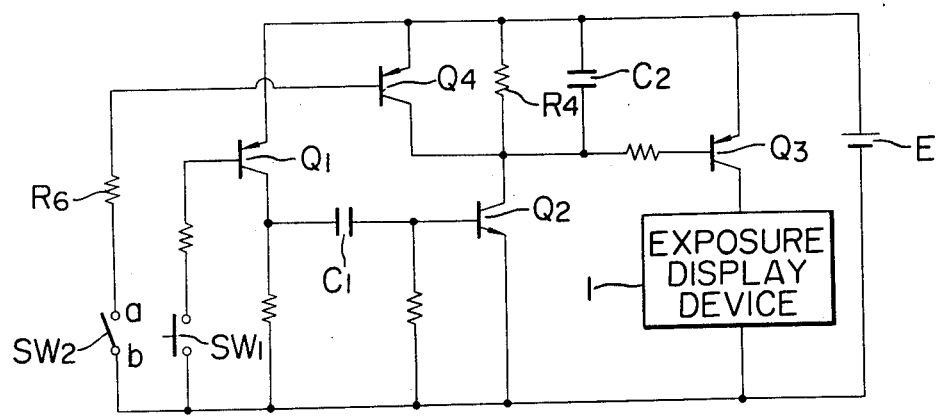

The circuit shown in FIG. 3 is different from that shown in FIG. 1 in that the resistor R4 is bridged by a transistor Q4 whose base is connected through a resistor R6 to said switch SW2 shown in FIG. 2.

In the above-explained structure the transistor Q4 is rendered conductive by the exposure completion signal produced by the closure of said switch SW2, whereby the capacitor C2 is discharged to turn off the transistor Q3. Then the shutter charging the switch SW2 is opened to turn off the transistor Q4, thereby enabling the charging of the capacitor C2 against the succeeding closure of the switch element SW1.

Figure 4:
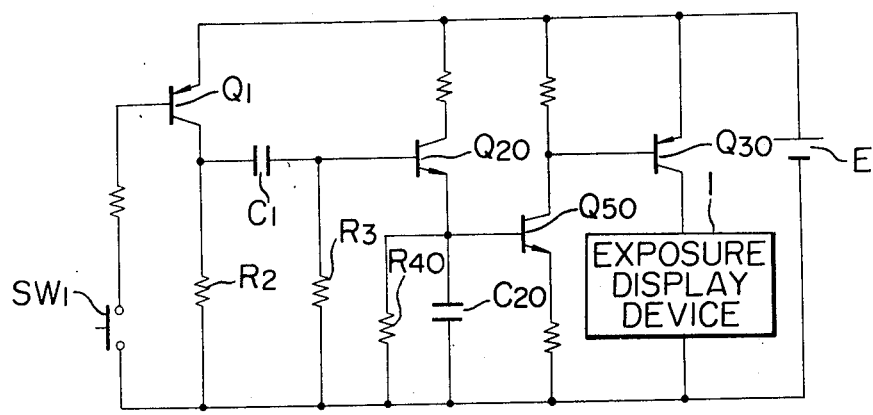
FIG. 4 is a circuit diagram of a third embodiment of the present invention.

In FIG. 4 there is shown a third embodiment of the present invention, wherein, upon closure of the switch element SW1, the transistor Q1 is rendered conductive to render, through the differentiating circuit C1 and R3, a transistor Q20 conductive during a short period, during which a timer capacitor C20 is charged to a voltage sufficient for rendering a transistor Q50 conductive. Thus the transistors Q50 and Q30 are rendered conductive and remain in this state, even after the transistor Q20 returns to non-conductive state, until the completion of gradual discharge of said timer capacitor C20 with a time constant determined by the charge thereof and the resistor R40. In this manner it is possible to interrupt the power supply to the load 1 even before the lapse of the predetermined time after the actuation of the shutter release button, thereby preventing unnecessary consumption of the power source E.

We claim:

1. In a power supply circuit for use in a photographic camera and provided with a power switch for connecting a load such as an exposure display device to a power source, the improvement comprising:
    a differentiating circuit for differentiating a switch closing signal generated when said power switch is closed;
    a timer circuit responsive to the output of said differentiating circuit for initiating a timing operation upon the closing of said power switch, said timing operation terminating after the lapse of a predetermined period which is independent of the length of time said power switch is closed; and
    means responsive to the output of said timer circuit for connecting said load to the power source only during said timing operation.

2. A power supply circuit according to claim 1, wherein said timer circuit comprises:
    a capacitor;
    means for connecting said capacitor to the power source in response to the output of said differentiating circuit; and
    means for discharging said capacitor according to a predetermined time constant.

3. A power supply circuit according to claim 2, further comprising reset means connected to said capacitor and operable in cooperation with the shutter mechanism of said camera to enable charging of said capacitor at shutter charging and operable to disharge said capacitor at the completion of an exposure operable of said camera.

4. A power supply circuit according to claim 3, wherein said reset means comprises switch means operable in cooperation with said shutter mechanism, said switch means being connected parallel to said capacitor.

5. A power supply circuit according to claim 1, wherein said power switch is a touch-switch.

* * * * *